US011741563B2

(12) United States Patent
Kobayashi et al.

(10) Patent No.: US 11,741,563 B2
(45) Date of Patent: Aug. 29, 2023

(54) MANAGEMENT DEVICE, MANAGEMENT METHOD, AND MANAGEMENT PROGRAM

(71) Applicant: NIPPON TELEGRAPH AND TELEPHONE CORPORATION, Tokyo (JP)

(72) Inventors: Eiji Kobayashi, Musashino (JP); Yoshihiro Yoshida, Musashino (JP); Junko Hashimoto, Musashino (JP); Naoko Kosaka, Musashino (JP); Tsuneko Kura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 274 days.

(21) Appl. No.: 17/253,134

(22) PCT Filed: Jun. 24, 2019

(86) PCT No.: PCT/JP2019/024927
§ 371 (c)(1),
(2) Date: Dec. 17, 2020

(87) PCT Pub. No.: WO2020/004314
PCT Pub. Date: Jan. 2, 2020

(65) Prior Publication Data
US 2021/0264549 A1      Aug. 26, 2021

(30) Foreign Application Priority Data

Jun. 25, 2018   (JP) ................................ 2018-120024

(51) Int. Cl.
*G06Q 10/00*    (2023.01)
*G06Q 50/26*    (2012.01)
(Continued)

(52) U.S. Cl.
CPC ............. *G06Q 50/265* (2013.01); *G06F 3/14* (2013.01); *G06Q 10/10* (2013.01); *H04L 67/535* (2022.05); *H04L 67/54* (2022.05)

(58) Field of Classification Search
CPC ...... G06Q 50/265; G06Q 10/10; G06Q 10/06; G06F 3/14; H04L 67/535; H04L 67/54
See application file for complete search history.

(56) References Cited

U.S. PATENT DOCUMENTS

| 6,678,698 | B2* | 1/2004 | Fredell | ................... | G06Q 10/06 |
| | | | | | 707/999.01 |
| 2007/0168874 | A1* | 7/2007 | Kloeffer | ................. | G06Q 10/06 |
| | | | | | 715/764 |
| 2015/0002612 | A1* | 1/2015 | Yoshida | ................. | H04N 7/147 |
| | | | | | 348/14.08 |

FOREIGN PATENT DOCUMENTS

JP          5432941 B2      3/2014

OTHER PUBLICATIONS

"Track changes with the activity log" (retrieved at https://help.smartsheet.com/articles/2476206-track-sheet-changes-with-activity-log from a Google search with a publication date of Mar. 23, 2017) (Year: 2017).*

* cited by examiner

Primary Examiner — Gabrielle A McCormick
(74) Attorney, Agent, or Firm — XSENSUS LLP

(57) ABSTRACT

A server (10) stores a task ID of information on a task that is viewed by a client terminal (20) and a screen shot when the client terminal (20) logs out from the server (10) as a user activity log of the client terminal (20). In addition, when the client terminal (20) logs into the server (10) once again, the server (10) refers to the user activity log of the client terminal (20) and displays a screen shot upon a previous logout. Furthermore, the server (10) refers to a task ID (Continued)

included in the user activity log of the client terminal (20) and displays unread tasks of the client terminal (20).

16 Claims, 7 Drawing Sheets

(51) Int. Cl.
*G06F 3/14* (2006.01)
*G06Q 10/10* (2023.01)
*H04L 67/54* (2022.01)
*H04L 67/50* (2022.01)

Fig. 3

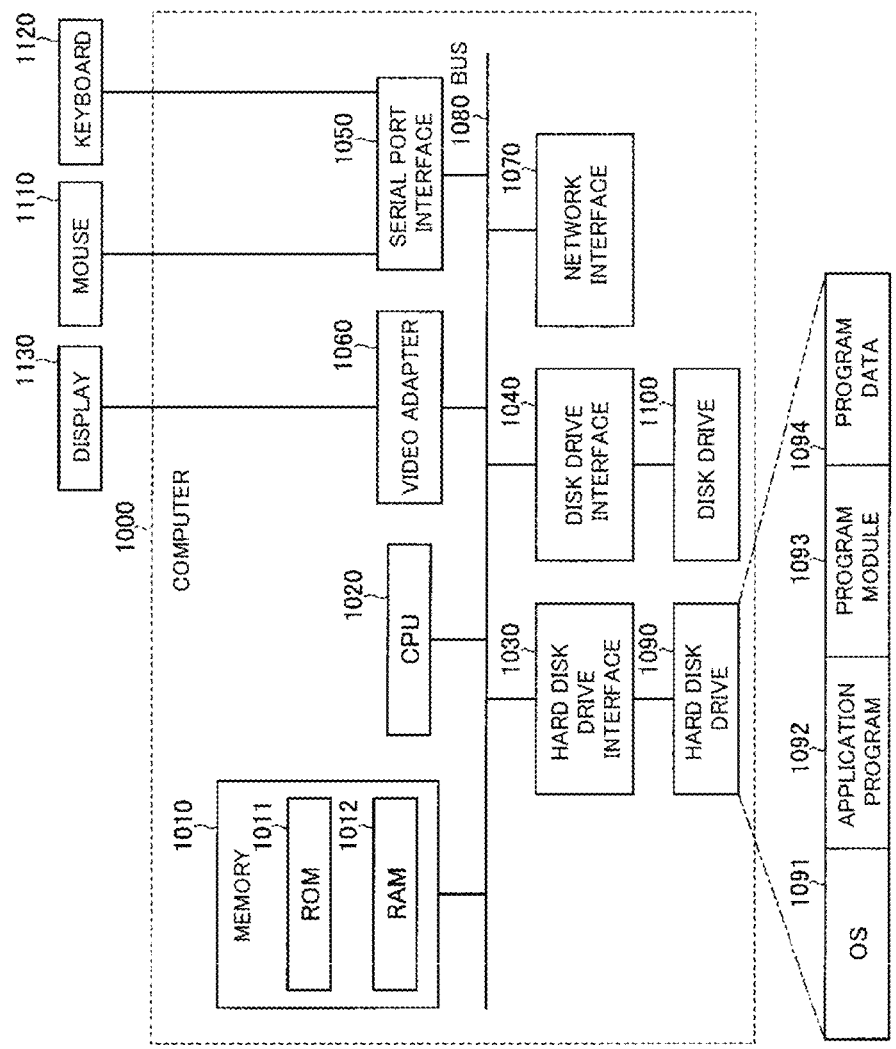

MANAGEMENT DEVICE, MANAGEMENT METHOD, AND MANAGEMENT PROGRAM

CROSS-REFERENCE TO RELATED APPLICATIONS

The present application is based on PCT filing PCT/JP2019/024927, filed Jun. 24, 2019, which claims priority to JP 2018-120024, filed Jun. 25, 2018, the entire contents of each are incorporated herein by reference.

TECHNICAL FIELD

The present invention relates to a management device, a management method, and a management program.

BACKGROUND ART

In conventional crisis response, response-in-progress and unresponded operations are confirmed once a day or so in units of organizations when a successor takes over the operations. In this case, with respect to the crisis response, a crisis response system records an operation progress status of an entire organization with a focus on response-in-progress and unresponded operations as an activity log and a responder taking over the operations continues crisis response operations while referring to the activity log.

CITATION LIST

Patent Literature

[PTL 1] Japanese Patent No. 5432941

SUMMARY OF THE INVENTION

Technical Problem

By referring to the activity log of the crisis response system described above, while the responder having taken over the crisis response operations can assess response-in-progress and unresponded operations, the responder cannot recognize operations that have been completed in his/her absence. Therefore, the responder having taken over the operations must dedicate time to search for information related to a response having occurred in relation to operations that have already been completed and may end up delaying operations. In consideration thereof, an object of the present invention is to solve the problem described above and enable a responder having taken over operations to perform crisis response in an efficient manner.

Means for Solving the Problem

In order to solve the problem described above, the present invention is a management device which manages a progress status of crisis response of each user, the management device including: a status managing unit which manages information indicating a progress status of crisis response; an information sharing unit which manages information on tasks that are related to the crisis response; a log creating unit which outputs a task ID of information on one or more of the tasks having been viewed by a user's terminal when the user's terminal is being logged into the management device and display information by the status managing unit on the user's terminal when the user's terminal logs out as a user activity log of the user's terminal to a storage unit; and a log acquiring unit which, after the user's terminal logs into the management device once again, acquires a user activity log of the user's terminal from the storage unit, wherein the status managing unit displays, on the user's terminal, information indicating a current progress status of crisis response together with display information upon logout from a previous login by the user's terminal which is included in the acquired user activity log, and the information sharing unit refers to a task ID included in the acquired user activity log and displays, on the user's terminal, information on tasks other than information on a task indicated by the task ID among information on tasks that is viewable by the user's terminal as unread tasks.

Effects of the Invention

According to the present invention, a responder having taken over operations can perform crisis response in an efficient manner.

BRIEF DESCRIPTION OF DRAWINGS

FIG. 3 is a diagram showing an example of a display screen after selection and input of a user activity log acquisition button have been performed on the display screen shown in FIG. 2.

FIG. 7 is a diagram showing a configuration example of a computer that executes a management program.

DESCRIPTION OF EMBODIMENT

Hereinafter, a mode (an embodiment) for carrying out the present invention will be described with reference to the drawings. It is to be understood that the present invention is not limited to the present embodiment.

Figure 1:
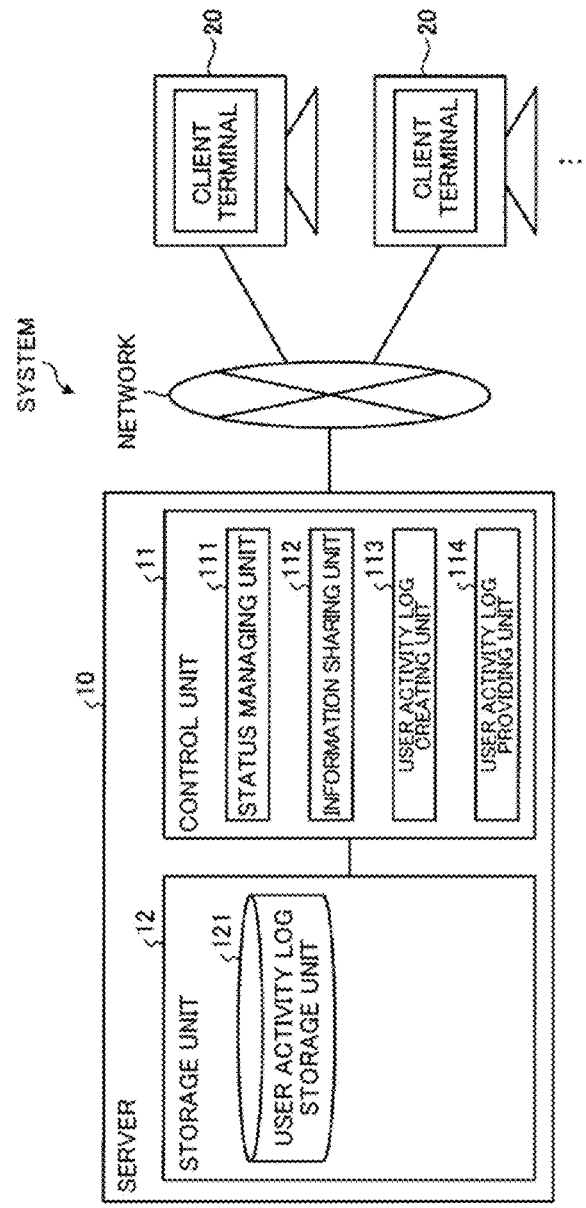
FIG. 1 is a diagram showing a configuration example of a system.

First, with reference to FIG. 1, a configuration example of a system including a management device (a server) according to the present embodiment will be described. For example, as shown in FIG. 1, the system includes a server 10 and one or more client terminals 20. The server 10 and the client terminals 20 are connected to each other via a network such as the Internet.

The server 10 is a server that manages various pieces of information related to crisis response. A client terminal 20 is a terminal to be used by, for example, a member of an organization that performs crisis response. For example, after accepting a login by a client terminal 20, the server 10 transmits various pieces of information related to crisis response in accordance with a request from the client terminal 20 and records information related to crisis response having been transmitted from the client terminal 20.

In this case, for example, the server 10 records which piece of information (information on which task) had been viewed by a client terminal 20 among information related to crisis response as a user activity log of the client terminal 20.

Figure 2:
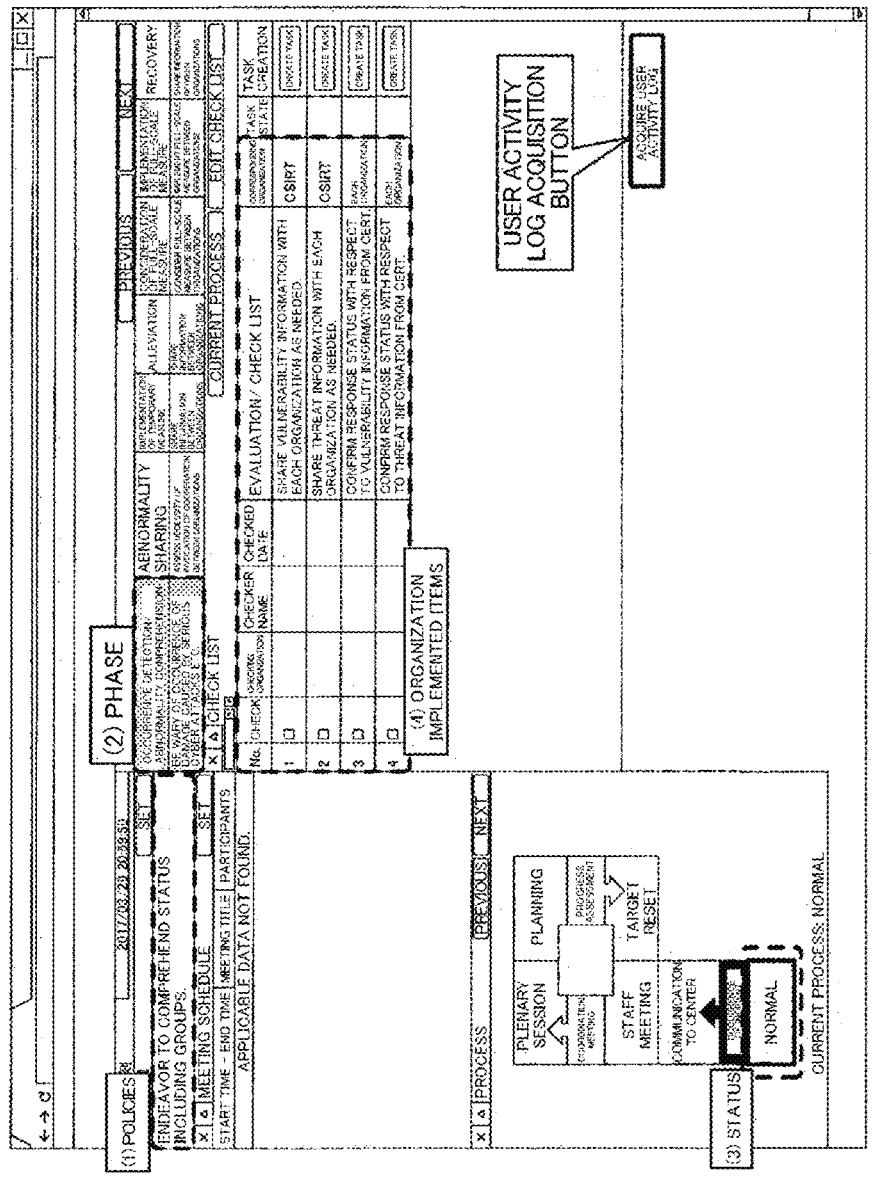
FIG. 2 is a diagram showing an example of a display screen by a status managing unit shown in FIG. 1.

In addition, the server 10 also records a screen shot of a display screen (for example, refer to FIG. 2) upon logout by a client terminal 20 as a user activity log of the client terminal 20.

Figure 3:
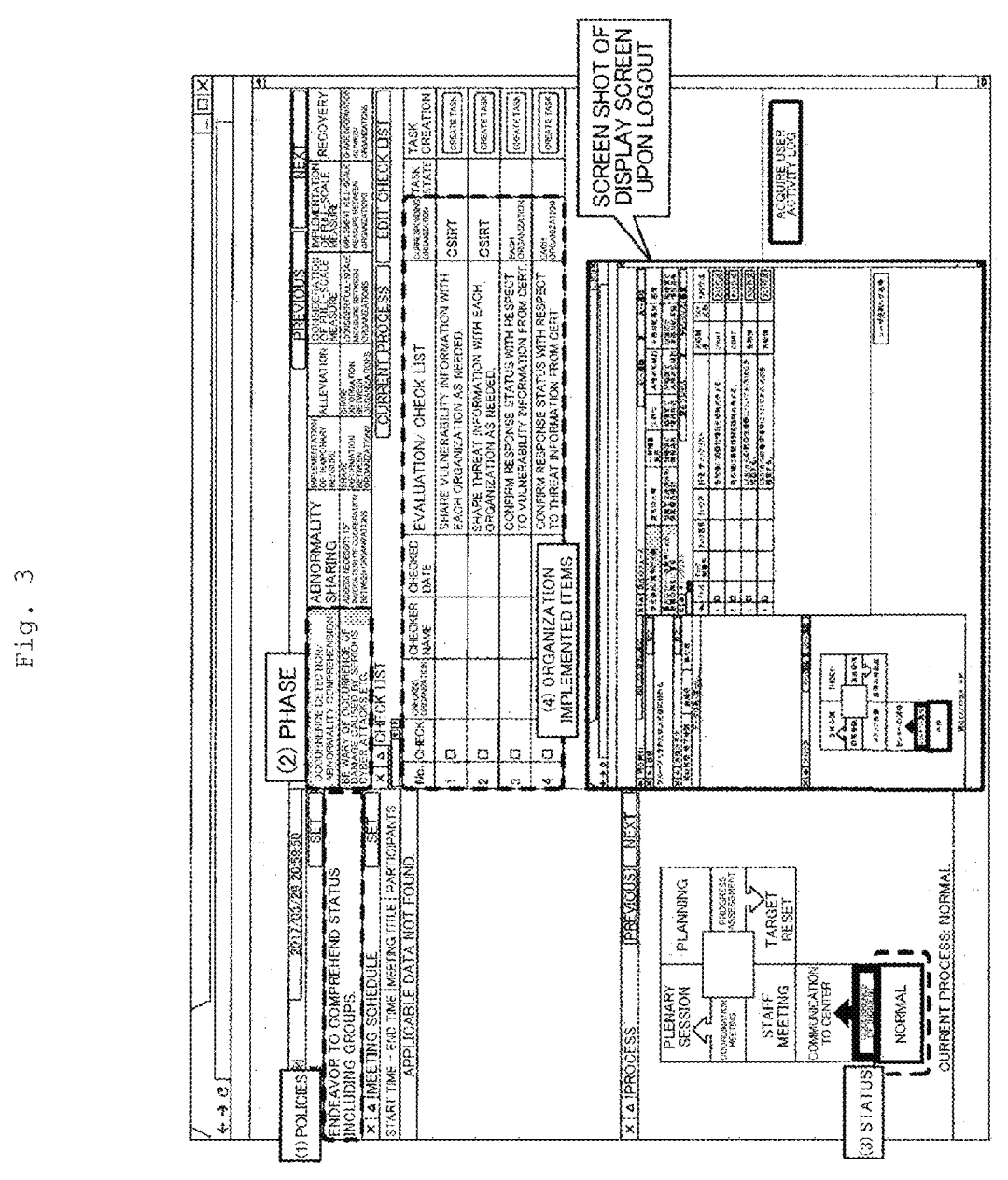

Furthermore, when a client terminal 20 logs into the server 10 once again, the server 10 refers to the user activity log of the client terminal 20 and displays the screen shot of the display screen upon a previous logout by the client terminal 20 (refer to FIG. 3). In addition, the server 10 refers to information on tasks which have already been viewed and which are recorded in the user activity log of the client terminal 20 and displays information (unread tasks) on tasks that have not been read among information on tasks that are viewable by the client terminal 20 (refer to FIG. 4).

According to the server 10 described above, a member of an organization that performs crisis response can more readily confirm how a status related to crisis response has changed from a previous logout. As a result, for example, a member having taken over operations related to crisis response can more readily comprehend operations or the like that have been completed in the absence of the member. In addition, the member having taken over operations can more readily retrieve information to be referred to with respect to responses that have occurred in relation to operations having already been completed.

The server 10 will be described in detail with further reference to FIG. 1. The server 10 includes a control unit 11 and a storage unit 12. The control unit 11 includes a status managing unit 111, an information sharing unit 112, a user activity log creating unit (a log creating unit) 113, and a user activity log providing unit 114.

The status managing unit 111 manages information indicating a progress status of crisis response. For example, the status managing unit 111 manages information indicating policies related to crisis response, a current phase, a current status, items implemented by each organization, and the like. For example, when the status managing unit 111 reads information indicating policies related to crisis response, a current phase, a current status, items implemented by each organization, and the like from the storage unit 12, the status managing unit 111 displays a display screen presenting the pieces of information on a client terminal 20 of an organization that performs crisis response (refer to FIG. 2). It should be noted that items implemented by each organization are associated with, for example, tasks related to crisis response.

The information sharing unit 112 manages information on tasks related to crisis response. For example, the information sharing unit 112 provides communication means for each organization to carry out tasks related to crisis response. In addition, for each task related to crisis response, the information sharing unit 112 manages contents of communication from start to completion of the task as a series of related pieces of data.

Figure 4:
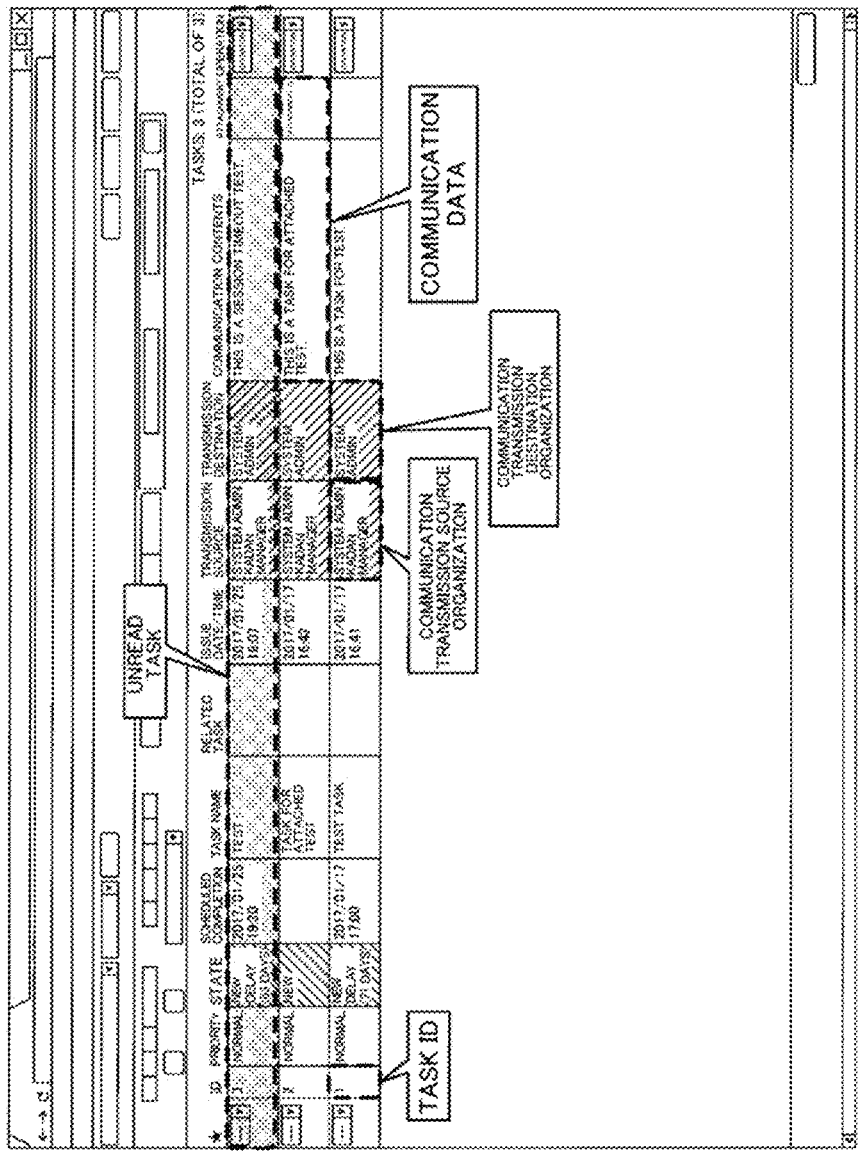
FIG. 4 is a diagram showing an example of a display screen by an information sharing unit shown in FIG. 1.

For example, when the information sharing unit 112 reads information stored in the storage unit 12 such as a task ID related to crisis management, data of communication within an organization or between organizations related to a task with the task ID, and a transmission source organization and a transmission destination organization of the communication data, the information sharing unit 112 displays a display screen presenting the pieces of information on a client terminal 20 of each organization (refer to FIG. 4).

The user activity log creating unit 113 outputs identification information (a task ID) of information on one or more tasks having been viewed by a client terminal 20 to a user activity log storage unit 121 (to be described later) as a user activity log of the client terminal 20. In addition, the user activity log creating unit 113 also outputs display information by the status managing unit 111 (for example, a screen shot of a display screen on the client terminal 20 by the status managing unit 111) upon logout of the client terminal 20 to the user activity log storage unit 121 (to be described later) as a user activity log of the client terminal 20.

For example, when the user activity log creating unit 113 acquires a task ID of information on a task having been viewed by a client terminal 20 from the information sharing unit 112, the user activity log creating unit 113 associates the acquired task ID with a user ID of the client terminal 20 and outputs the associated information to the user activity log storage unit 121. When the information on the task described above is displayed by a Web browser or the like, a URL or the like of the information on the task is used as the task ID described above. In other words, in this case, as information on the task having been viewed by the client terminal 20, a URL of the information on the task having been viewed by the client terminal 20 is recorded.

In addition, the user activity log creating unit 113 acquires a state of the status managing unit 111 upon logout of a client terminal 20 by acquiring a screen shot of a display screen of the status managing unit 111 or the like, associates the acquired state with the user ID of the client terminal 20, and outputs the associated information to the user activity log storage unit 121.

The user activity log providing unit 114 acquires a user activity log of a client terminal 20 from the user activity log storage unit 121 based on, for example, an instruction input from the client terminal 20. For example, when the user activity log providing unit 114 detects that a button (refer to FIG. 3) indicating "acquire user activity log" on a screen of the system is selected and input by a client terminal 20, the user activity log providing unit 114 acquires the user activity log of the client terminal 20 from the user activity log storage unit 121.

In addition, the user activity log providing unit 114 outputs a task ID included in the acquired user activity log of the client terminal 20 to the information sharing unit 112. Furthermore, the user activity log providing unit 114 outputs a state of the status managing unit 111 upon previous logout by the client terminal 20 (for example, a screen shot of a display screen of the status managing unit 111) which is included in the acquired user activity log of the client terminal 20 to the status managing unit 111.

In addition, the information sharing unit 112 refers to the task ID output by the user activity log providing unit 114 and displays information on tasks other than information on a task indicated by the task ID among information on tasks that are viewable by the client terminal 20 as unread tasks (refer to FIG. 4). Accordingly, a user of the client terminal 20 can confirm that, among information on tasks with task IDs "1" to "3" shown in FIG. 4, information on the task with the task ID "3" has not yet been viewed (unread).

Furthermore, together with a current display screen of the system, the status managing unit 111 displays a screen shot of a display screen of the status managing unit 111 upon a previous logout by the client terminal 20 which is output by the user activity log providing unit 114 (refer to FIG. 3). Accordingly, the user of the client terminal 20 can confirm, for example, how policies related to crisis response, a current phase, a current status, items implemented by each organization, and the like have changed from a previous logout.

The storage unit 12 includes the user activity log storage unit 121. The user activity log storage unit 121 stores user activity logs output by the user activity log creating unit 113. In addition, although not illustrated in FIG. 1, the storage unit 12 stores various pieces of information to be referred to by the information sharing unit 112 and the status managing unit 111.

Figure 5:
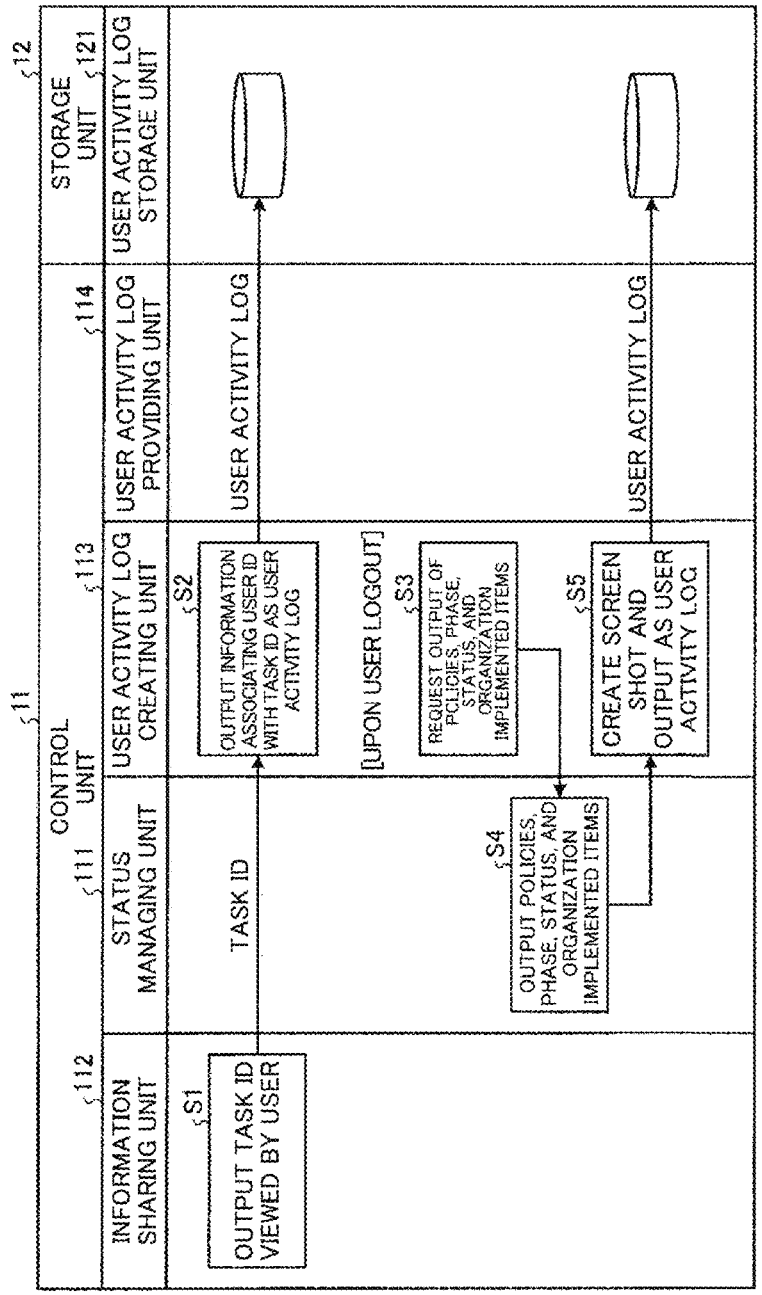
FIG. 5 is a diagram illustrating a storage procedure of a user activity log according to a server shown in FIG. 1.

Next, an example of processing procedures of the server 10 will be described. First, an example of a storage procedure of a user activity log according to the server 10 will be described with reference to FIG. 5.

First, the information sharing unit 112 of the server 10 outputs a task ID of information on a task that is viewed by a client terminal 20 to the user activity log creating unit 113 (S1: output of task ID viewed by user). Next, the user activity log creating unit 113 outputs information associating a user ID of a client terminal 20 that has viewed the information on the task and the task ID output in S1 with each other to the user activity log storage unit 121 as a user activity log of the client terminal 20 (S2).

In addition, when the user activity log creating unit 113 detects logout by a client terminal 20 (upon user logout), the user activity log creating unit 113 issues a request to the status managing unit 111 to output policies (policies related to crisis response), a phase (a current phase), a status (a current status), organization implemented items (items implemented by each organization) which have been displayed by the status managing unit 111 on the client terminal 20 (S3). Subsequently, when the user activity log creating unit 113 receives the policies, the phase, the status, and the organization implemented items which have been output from the status managing unit 111 and displayed on the client terminal 20 (S4), the user activity log creating unit 113 creates a screen shot of a display screen indicating these pieces of information and outputs the screen shot to the user activity log storage unit 121 as a user activity log of the client terminal 20 (S5). The user activity log generating unit 113 also assigns the user ID of a client terminal 20 output in S1 to the user activity log.

Accordingly, the user activity log storage unit 121 of the server 10 stores a user activity log of each client terminal 20.

Figure 6:
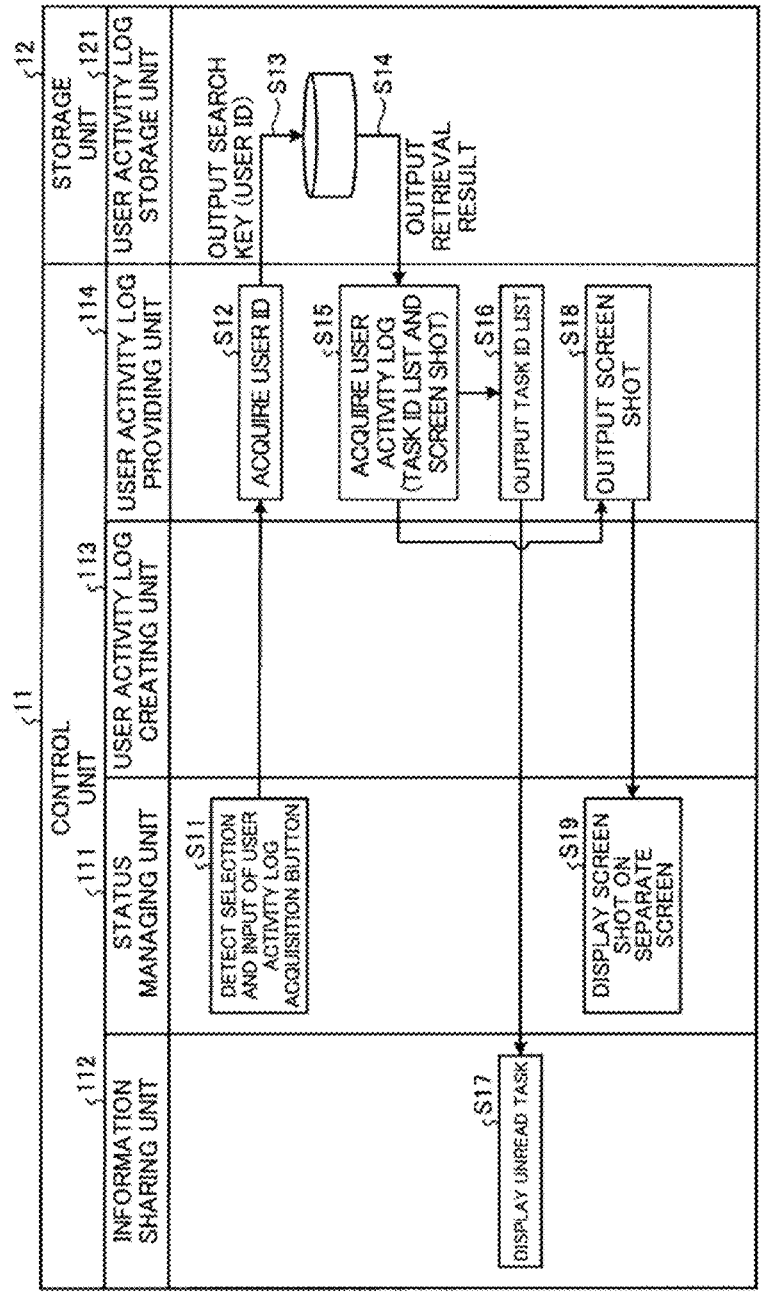
FIG. 6 is a diagram illustrating a presentation procedure of a user activity log according to the server shown in FIG. 1.

Next, an example of a provision procedure of a user activity log according to the server 10 will be described with reference to FIG. 6.

First, when the status managing unit 111 of the server 10 detects that a user activity log acquisition button (refer to FIG. 2) on a display screen is selected and input by a client terminal 20 (S11), the user activity log providing unit 114 acquires a user ID of the client terminal 20 from the status managing unit 111 (S12). In addition, the user activity log providing unit 114 outputs the user ID acquired in S12 as a search key for a user activity log to the user activity log storage unit 121 (S13: search key (user ID) output). Subsequently, using the user ID output in S13 as a search key, the user activity log storage unit 121 retrieves a user activity log of the client terminal 20 and outputs a retrieval result (the user activity log) to the user activity log providing unit 114 (S14).

When the user activity log providing unit 114 acquires the user activity log (a task ID list and a screen shot) of the client terminal 20 from the user activity log storage unit 121 (S15), the user activity log providing unit 114 outputs the task ID list included in the user activity log to the information sharing unit 112 (S16). In addition, the user activity log providing unit 114 outputs the screen shot included in the user activity log to the status managing unit 111 (S18).

After S16, the information sharing unit 112 refers to the task ID list output in S16 and displays information on tasks other than information on tasks indicated by the task ID list among information on tasks that are viewable by the client terminal 20 as unread tasks (S17). For example, as shown in FIG. 4, the information sharing unit 112 colors and displays unread tasks among information (task IDs "1" to "3") on task that are viewable by the client terminal 20.

In addition, after S18, the status managing unit 111 displays the screen shot output in S18 on a separate screen (S19). For example, as shown in FIG. 3, the status managing unit 111 displays the screen shot output in S18 of a display screen upon logout on a separate screen to a screen currently being displayed on the client terminal 20.

According to the server 10 described above, a member of an organization that performs crisis response can more readily confirm how a status related to crisis response has changed from a previous logout. As a result, for example, a member having taken over operations related to crisis response can more readily comprehend operations or the like that have been completed in the absence of the member. In addition, the member having taken over operations can more readily retrieve information to be referred to with respect to responses that have occurred in relation to operations having already been completed.

[Program]

The server 10 described in the above embodiments may be implemented by installing a program that realizes functions of the server 10 on a desired information processing device (a computer). For example, by having the information processing device run the program described above that is provided as packaged software or online software, the information processing device can be caused to function as the server 10. The information processing device as described herein includes desktop or notebook personal computers. In addition thereto, the information processing device includes mobile communication terminals such as a smart phone, a mobile phone, and a PHS (Personal Handyphone System) as well as a PDA (Personal Digital Assistant) and the like. Alternatively, the server 10 may be mounted on a cloud server.

An example of a computer that executes the program (a management program) described above will be described using FIG. 7. As shown in FIG. 7, for example, a computer 1000 has a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM (Random Access Memory) 1012. For example, the ROM 1011 stores a boot program such as a BIOS (Basic Input Output System). The hard disk drive interface 1030 is connected to a hard disk drive 1090. The disk drive interface 1040 is connected to a disk drive 1100. For example, an attachable/detachable storage medium such as a magnetic disk or an optical disk is inserted into the disk drive 1100. For example, a mouse 1110 and a keyboard 1120 are connected to the serial port interface 1050. For example, a display 1130 is connected to the video adapter 1060.

In this case, for example, as shown in FIG. 7, the hard disk drive 1090 stores an OS 1091, an application program 1092, a program module 1093, and program data 1094. The various pieces of data and information described in the embodiments presented above are stored in, for example, the hard disk drive 1090 or the memory 1010.

In addition, the CPU 1020 loads the program module 1093 and the program data 1094 stored in the hard disk drive 1090 as necessary to the RAM 1012 and executes the respective procedures described above.

The program module 1093 and the program data 1094 related to the management program described above are not limited to being stored in the hard disk drive 1090 and, for example, the program module 1093 and the program data 1094 may be stored in an attachable/detachable storage medium and read by the CPU 1020 via the disk drive 1100 or the like. Alternatively, the program module 1093 and the program data 1094 related to the program described above may be stored in another computer that is connected via a network such as a LAN (Local Area Network) or a WAN (Wide Area Network) to be read by the CPU 1020 via the network interface 1070.

REFERENCE SIGNS LIST

10 Server (management device)
11 Control unit
12 Storage unit
20 Client terminal (terminal)
111 Status managing unit
112 Information sharing unit
113 User activity log creating unit
114 User activity log providing unit
121 User activity log storage unit

The invention claimed is:

1. A management device which manages a progress status of a crisis response of one or more users, the management device comprising:
   processing circuitry configured to
   manage progress information indicating a progress status of the crisis response, the progress information including policies related to the crisis response, a current phase of the crisis response, a current status of the crisis response, and items or actions implemented by a user or an organization in the crisis response;
   manage task information indicating tasks related to the crisis response;
   generate, for display on a user terminal when the user terminal is logged into the management device, a task identifier (ID) of particular task information corresponding to one or more of the tasks viewed by the user terminal;
   when the user terminal logs out of the management device, generate a user activity log of activity performed at the user terminal and capture a screen shot of the user terminal of a display output of the user terminal and then store the user activity log and the screen shot in a storage;
   acquire, after the user terminal logs into the management device once again, the user activity log of the user terminal and the screen shot from the storage;
   generate, for display on the user terminal, a display output including a first portion and a second portion, wherein the first portion including progress information indicating a current progress status of the crisis response and open task IDs for the crisis response, and the second portion including the screen shot; and
   refer to a task ID included in the acquired user activity log to generate, for display on the user terminal, unread task information related to a task that is task that is viewable by the user terminal but has not yet been viewed by the user terminal.

2. The management device according to claim 1, wherein the first portion includes a first window, a second window and a third window,
   the first window includes information related to current policies related to the crisis response,
   the second window includes information related to current phase of the crisis response, and
   the third window includes information related to a current status of the crisis response.

3. The management device according to claim 1, wherein the processing circuitry creates the screen shot of the user terminal upon detection of user terminal logging out of the management device.

4. The management device according to claim 1, wherein the processing circuitry is further configured to acquire the user activity log in response to a user of the user terminal selecting a button indicating to acquire the user activity log.

5. The management device according to claim 1, wherein
   the display output, including the first portion and the second portion, further includes a button indicating to acquire the user activity log, and
   the processing circuitry acquires the user activity log in response to a user of the user terminal selecting the button.

6. The management device according to claim 5, wherein the processing circuitry is further configured to generate the unread task information, for display output to the user, in response to the user selecting the button.

7. The management device according to claim 1, wherein
   the unread task information is displayed at the user terminal at one time, and
   the screen shot is displayed at the user terminal at another time different from the one time.

8. The management device according to claim 1, wherein the display output indicates changes between the first portion and the second portion.

9. A management method executed by a management device which manages a progress status of a crisis response of one or more users, the management method comprising:
   managing progress information indicating a progress status of the crisis response, the progress information including policies related to the crisis response, a current phase of the crisis response, a current status of the crisis response, and items or actions implemented by a user or an organization in the crisis response;
   managing task information indicating tasks related to the crisis response;
   generating, for display on a user terminal when the user terminal is logged into the management device, a task identifier (ID) of particular task information corresponding to one or more of the tasks viewed by the user terminal;
   when the user terminal logs of the management device, generating a user activity log of activity performed at the user terminal and capturing, by a server, a screen shot of the user terminal of a display output of the user terminal and then storing the user activity log and the screen shot in a storage;
   acquiring, after the user terminal logs into the management device once again, the user activity log of the user terminal and the screen shot from the storage;
   generating, for display on the user terminal, a display output including a first portion and a second portion, wherein the first portion including progress information indicating a current progress status of the crisis response and open task IDs for the crisis response, and the second portion including the screen shot; and
   referring to a task ID included in the acquired user activity log to generate, for display on the user terminal, unread task information related to a task that is viewable by the user terminal but has not yet been viewed by the user terminal.

10. The management method according to claim 9, wherein
the first portion includes a first window, a second window and a third window,
the first window includes information related to current policies related to the crisis response,
the second window includes information related to current phase of the crisis response, and
the third window includes information related to a current status of the crisis response.

11. The management method according to claim 9, further comprising creating the screen shot of the user terminal upon detection of user terminal logging out of the management device.

12. The management method according to claim 9, further comprising acquiring the user activity log in response to a user of the user terminal selecting a button indicating to acquire the user activity log.

13. The management method according to claim 9, wherein
the display output, including the first portion and the second portion, further includes a button indicating to acquire the user activity log, and
the user activity log is acquired in response to a user of the user terminal selecting the button.

14. The management method according to claim 13, wherein the generating the unread task information, for display output to the user, is performed in response to the user selecting the button.

15. The management method according to claim 9, wherein
the unread task information is displayed at the user terminal at one time, and
the screen shot is displayed at the user terminal at another time different from the one time.

16. A non-transitory computer readable medium storing computer executable instructions which, when executed by processing circuitry of a management device which manages a progress status of a crisis response of one or more users, cause the management device to:
manage progress information indicating a progress status of the crisis response, the progress information including policies related to the crisis response, a current phase of the crisis response, a current status of the crisis response, and items or actions implemented by a user or an organization in the crisis response;
manage task information indicating tasks related to the crisis response;
generate, for display on a user terminal when the user terminal is logged into the management device, a task identifier (ID) of particular task information corresponding to one or more of the tasks viewed by the user terminal;
when the user terminal logs of the management device, generate a user activity log of activity performed at the user terminal and capture a screen shot of the user terminal of a display output of the user terminal and then store the user activity log and the screen shot in a storage;
acquire, after the user terminal logs into the management device once again, the user activity log of the user terminal and the screen shot from the storage;
generate, for display on the user terminal, a display output including a first portion and a second portion, wherein the first portion including progress information indicating a current progress status of the crisis response and open task IDs for the crisis response, and the second portion including the screen shot; and
refer to a task ID included in the acquired user activity log to generate, for display on the user terminal, unread task information related to a task that is viewable by the user terminal but has not yet been viewed by the user terminal.

* * * * *